April 30, 1963     A. MUSSCHOOT ET AL     3,087,618
DEVICE FOR SEPARATING FINE FROM COARSE MATERIALS
Filed April 20, 1959
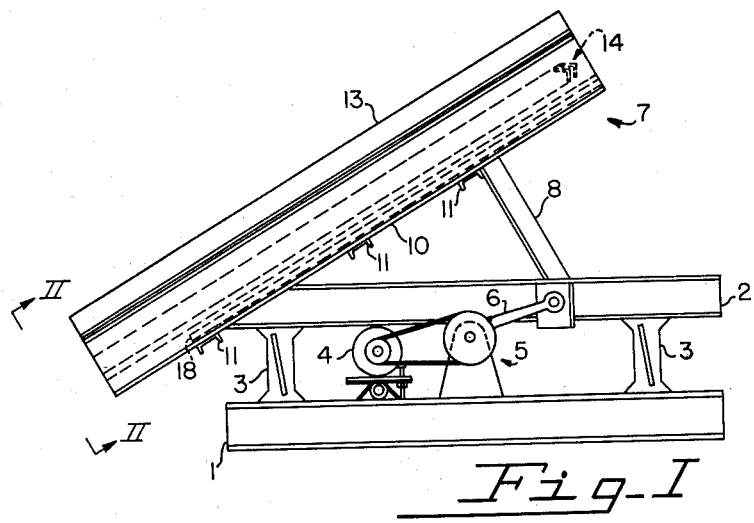
Fig-I
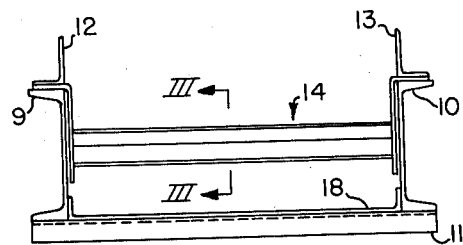
Fig-II
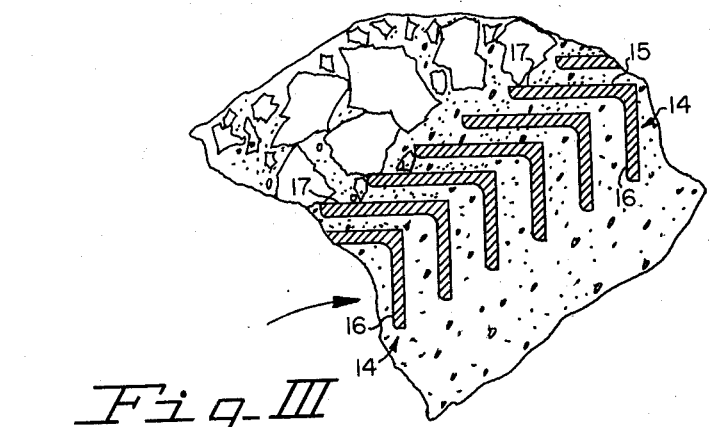
Fig-III
INVENTOR.
ALBERT MUSSCHOOT
BY  LEONARD B. WILSON
Marshall, Marshall & Yeasting
ATTORNEYS United States Patent Office 3,087,618
Patented Apr. 30, 1963

3,087,618
DEVICE FOR SEPARATING FINE FROM COARSE MATERIALS
Albert Musschoot and Leonard B. Wilson, near Louisville, Ky., assignors, by mesne assignments, to Chain Belt Company, Milwaukee, Wis., a corporation of Wisconsin
Filed Apr. 20, 1959, Ser. No. 807,551
4 Claims. (Cl. 209—329)

One of the most important and frequently employed operations in processing mixtures of lumpy, pebbly, granular and pulverulent materials is the separation of relatively fine components from coarser components of such mixtures. In processing run-of-the-mine coal, for example, coal dust is separated from lump coal and from nut coals. Hundreds of other examples could be given; dirt is separated from root crops such as beets; fines are separated from ores; sand is separated from coarse gravel and so forth.

Hard dry substances usually are separated into coarse and fine fractions by screening, and various expedients are employed to improve the completeness of the separation and to avoid clogging of screens. With some commodities, washing and selective flotation has been resorted to.

Heavy broken commodities such as rock are processed on so-called "grizzlies," having shaking decks of spaced bars over which the lumps pass while the fines fall through the spaces between the bars. Pieces of intermediate size, however, are liable to stick between the bars in such numbers as to interfere with the functioning of grizzlies. This wedging of pieces between the bars or in the screens is known in the art as "blinding."

Various specific modifications of screens and grizzlies have been incorporated in vibratory conveyors which convey the larger pieces over the screening decks while the smaller pieces or particles fall through.

The instant invention utilizes, in lieu of a screen, an inclined chute the bottom of which is louvered to resemble an open stairs, i.e. having treads or steps but no risers. The vertical spacing between the top of one step and the bottom of the next above determines the dividing point between coarse and fine particles and is made approximately equal to the maximum particle size to be classed with the "fines." This dimension also corresponds to the minimum size of a coarse particle. The steps themselves are approximately horizontal and the chute, including the steps, is vibrated along a path tending to convey material on the steps through the spaces between the steps. The fine material passes through the spaces between the steps; particles of intermediate sized material, moving with the fine material, are caught by the nose of the next step and projected onto a lower step; while chunks large with respect to the steps merely roll down the chute.

It is, therefore, an object of this invention to provide a device for effecting very thorough separation of fine components from coarse components of dry flowable commodities.

It is a further object to provide a device for vibratorily conveying granular or pulverulent components of mixture in one direction while coarser lumpy components of such mixture are conveyed in another direction.

It is a further object to provide a device having vibratory conveying means which automatically selects fine components of a mixture and conveys them in one direction and means which guides coarser components to travel in another direction, the conveying means and the guiding means being rigidly connected together and performing their distinct functions without movement relative to each other.

And it is still a further object to provide a device such as that outlined above having means to convey to finer components of a mixture and discharge the same at a point remote from that at which the coarser components are discharged.

A preferred form of the invention is illustrated in the accompanying drawings.

In the drawings:

FIG. I is an elevational view of a machine incorporating the device of the instant invention;

FIG. II is a view, taken substantially as indicated by the line II—II of FIG. I, of the end of the a chute forming part of the device of the instant invention; and FIG. III is a somewhat diagrammatic fragmentary section taken along the line III—III of FIG. II showing the arrangement in echelon of a series of angleform bars extending across a chute and constituting stair steps or miniature vibratory conveyor decks.

The following description and the accompanying drawings describe and illustrate a preferred form of the instant invention but they are not intended to limit its scope.

The machine in which our invention is incorporated has a base 1 upon which is mounted a vibratory frame 2 that is carried by resilient supports 3 extending upwardly from the base 1 to the frame 2. The supports 3 are generally similar to those shown in U.S. Patents Nos. 2,706,112 and 2,846,210.

The resilient supports 3 are so constructed and arranged as to permit the frame 2 to vibrate along an inclined path that would cause dry flowable material on the frame 2 to be conveyed along the frame from left to right (as seen in FIG. I) in a well known manner. The frame 2 is vibrated by means of a motor 4, transmission mechanism 5 and a connecting link 6 with a motion that would cause material resting on the frame to be conveyed in a sequence of small tosses, in such well known manner.

The frame 2 extends nearly horizontally, while rigidly supported thereon is a chute 7 the right end of which (as seen in FIG. I) is held up by means of a pair of stays 8 so that the chute 7, which is welded to the frame 2 adjacent its left end, slope downwardly and to the left at an angle which may vary but which is shown in the drawing as being inclined approximately 30° from the horizontal.

The chute 7 may consist simply of wide channel shaped side members 9 and 10 held together by narrow channel shaped cross members 11. The height of the side members 10 may be extended when desired by angle members 12 and 13 as shown in FIGS. I and II.

The bottom of the chute 7 is not solid but consists of a series of transverse angle bars 14 (FIG. III) arranged in echelon and welded to the side members 10) with one of the flat sides of each angle bar constituting a miniature nearly horizontal deck 15 similar to a stair step and the other flat side of each bar constituting a flange 16 to stiffen the horizontal side 15.

As is clearly shown in FIG. III the left margin 17 of each miniature deck 15 projects from beneath another deck. These projecting margins catch small particles which sift from between larger lumps that cascade downwardly to the left over the protruding margins of the decks. The small particles that are caught by the protruding margins are vibratorily conveyed to the right and fall downwardly between the flanges 16 into a trough 18 leading to a "fines" receptacle.

Preferably the angle of attack, the angle between the path of the vibratory motion of the chute and the surface of the steps or miniature deck 15, is approximately ten degrees. This angle is selected to provide a substantial horizontal vibration of the decks so that the nose of each step may project any particles in contact therewith beyond the nose of the next lower step. Also the vertical component of vibration should be just sufficient to provide conveying to prevent interference between the material and the bottom of the next above step. These requirements are met with a vibratory stroke in the order of 5/16 inch at a frequency of 900 cycles per minute.

The chute as a whole may incline downwardly at an angle in the order of thirty degrees.

The almost complete absense of "blinding," i.e., clogging of the spaces between the steps, follows from the location of the screening slots, in the "shade" of the noses of the superadjacent steps which practically eliminates any forceful driving of particles into the slots. In contrast, particles entering the holes of an ordinary screen are forcefully driven into the holes by the impact of larger chunks of material. In the "open stairs" or step arrangement the forward edge of each step takes impact force.

An "open stair" screen 1.5 feet wide by 5 feet long with a 3/16 inch open spacing between horizontal steps and a thirty degree overall slope operating at 5/16 inch stroke and 900 cycles per minute had a screening capacity in the order of ninety tons per hour. A rerun of the coarse fraction of one sample showed less than one percent fines remaining after the first pass over the screen.

The spacing between steps may be varied over wide limits according to the size of the particles to be separated. The overall slope of the chute or assembly of steps may also be varied between wide limits, steeper slopes being preferable for materials that are predominantly fines and flatter slopes being preferable for coarser materials. The thirty degree angle appears to give best overall separation with high capacity.

The "open stair" or louvered arrangement thus combines high processing capacity with minimum maintenance. The heavy structure of the individual steps can, without maintenance, outlast many conventional screens.

It is to be understood that the form of device decribed in this specification and illustrated in the accompanying drawings is exemplary only and that the invention includes modification within the scope of the subjoined claims.

We claim:

1. A machine for separating fine particles from a mixture of coarse and fine particles comprising, a base, a frame mounted on the base for movement along an inclined path, means for vibrating the frame along the path with a motion capable of conveying material in a series of small tosses, a chute rigidly mounted on the frame, said chute being inclined in the same general direction as said path of vibration so as to vibrate generally along its length, said chute having a botton comprising a series of generally horizontal steps each of which partially overlaps its neighbor and is spaced therefrom in accordance with the size of the particle to be separated, and means for separately collecting those particles that pass through the spaces between the steps.

2. In a vibratory screening apparatus, in combination, an inclined screening chute, said chute having an inclined bottom comprising an echelon array of spaced apart bars each presenting a substantially horizontal surface to fine material in the chute, and means operatively connected to the chute to vibrate the chute along a generally straight path inclined from the horizontal in the same direction as the chute at an amplitude of vibration sufficient to convey fine material on the bars through the spaces between the bars while projecting coarse material down the chute.

3. In a vibratory screening apparatus, in combination, an inclined screening chute, said chute having an inclined bottom comprising a series of steps each separated vertically from its neighbors and each presenting a generally horizontal surface to fine material in the chute, said steps being arranged with a minimum clear space therebetween that is generally equal to the minimum dimension of particles to be carried along the chute, and means for vibrating the chute along a generally straight path inclined from the horizontal in the same direction as the chute with a generally straight line motion at a frequency and amplitude to toss material on the steps toward the fronts of the next higher steps, whereby the fine material is fed through the spaces between the steps and the larger particles are projected down the chute during the return cycle of vibration of the chute.

4. In a vibratory screening apparatus, in combination, an inclined chute, said chute having a bottom inclined as a whole and comprising a series of steps each having a front edge and a generally flat horizontal upper surface at least generally equal in width to the horizontal spacing of the steps, each step being spaced vertically from the adjacent steps, and means for vibrating the chute along a generally straight inclined path to convey fine material in a series of small tosses toward the gap between a step and the next higher step and project coarse material forward off the step by force transmitted through the front edge of the next higher step.

References Cited in the file of this patent

UNITED STATES PATENTS

| | | |
|---|---|---|
| 2,061,812 | Slater | Nov. 24, 1936 |
| 2,079,059 | Winkelman | May 4, 1937 |
| 2,157,562 | Overstrom | May 9, 1939 |
| 2,312,665 | Moore | Mar. 2, 1943 |
| 2,638,206 | Musschoot | May 12, 1953 |